(12) United States Patent
Botsford et al.

(10) Patent No.: US 10,447,755 B2
(45) Date of Patent: Oct. 15, 2019

(54) VIDEO STREAM TRANSMISSION OVER IP NETWORK

(71) Applicant: IMAGINE COMMUNICATIONS CORP., Englewood, CO (US)

(72) Inventors: Nelson Botsford, Bridgewater, NJ (US); Satyen Sukhtankar, Bridgewater, NJ (US)

(73) Assignee: IMAGINE COMMUNICATIONS CORP., Englewood, CO (US)

( * ) Notice: Subject to any disclaimer, the term of this patent is extended or adjusted under 35 U.S.C. 154(b) by 1155 days.

(21) Appl. No.: 14/658,299

(22) Filed: Mar. 16, 2015

(65) Prior Publication Data

US 2016/0277473 A1    Sep. 22, 2016

(51) Int. Cl.
  *G06F 11/10*    (2006.01)
  *H04J 3/06*    (2006.01)
  (Continued)

(52) U.S. Cl.
  CPC ........ *H04L 65/608* (2013.01); *H04L 65/4069* (2013.01); *H04L 65/604* (2013.01);
  (Continued)

(58) Field of Classification Search
  CPC ........ H04L 47/50; H04L 47/57–47/564; H04L 47/65–47/4076; H04N 21/2389;
  (Continued)

(56) References Cited

U.S. PATENT DOCUMENTS 7,103,019 B1 *  9/2006  Moon .................. H04W 36/18
                                                                370/328

2005/0125533 A1    6/2005  Svanbro et al.
(Continued)

FOREIGN PATENT DOCUMENTS

EP          2823616        1/2015
WO        2009007508        1/2009
(Continued)

OTHER PUBLICATIONS

Applicant: Imagine Communications Corp., International Search Report and Written Opinion, Authorized Officer: Jin Ick Lee; Date of Completion: Jul. 26, 2016; 11 pgs.
(Continued)

*Primary Examiner* — Nicholas R Taylor
*Assistant Examiner* — Ho T Shiu
(74) *Attorney, Agent, or Firm* — Tarolli, Sundheim, Covell & Tummino

(57) ABSTRACT

A system includes a first buffer that stores first media packets therein received from a first media stream. A second buffer stores second media packets therein received from a second media stream. The first media stream and the second media stream include redundant media content. A combiner reads media packets from each of the first and second buffers, and the combiner discards a given duplicate media packet read from one of the first or second buffers that has been identified as being identical to another of the media packets read from the other of the buffers based on analysis of a predetermined identifier in each of the media packets read from the first and second buffers. The combiner provides an output stream of media packets that includes only one of the identical media packets read from the first and second buffers.

21 Claims, 3 Drawing Sheets

(51) Int. Cl.
*H04L 12/741* (2013.01)
*H04L 1/00* (2006.01)
*H04L 29/06* (2006.01)
*H04N 21/63* (2011.01)
*H04N 21/2365* (2011.01)
*H04N 21/2381* (2011.01)
*H04N 21/61* (2011.01)
*H04N 21/643* (2011.01)
*H04N 21/6437* (2011.01)
*H04N 21/442* (2011.01)
*H04N 21/2389* (2011.01)
*H04N 21/438* (2011.01)
*H04N 21/4385* (2011.01)
*H04L 12/891* (2013.01)

(52) U.S. Cl.
CPC ......... *H04L 65/80* (2013.01); *H04N 21/2365* (2013.01); *H04N 21/2381* (2013.01); *H04N 21/6125* (2013.01); *H04N 21/631* (2013.01); *H04N 21/64322* (2013.01); *H04L 47/41* (2013.01); *H04N 21/2389* (2013.01); *H04N 21/4381* (2013.01); *H04N 21/4385* (2013.01); *H04N 21/44209* (2013.01); *H04N 21/6437* (2013.01)

(58) Field of Classification Search
CPC ......... H04N 21/4385; H04N 21/44209; H04N 21/631; H04N 21/6582
See application file for complete search history.

(56) References Cited

U.S. PATENT DOCUMENTS

| | | | |
|---|---|---|---|
| 2007/0036177 A1* | 2/2007 | Isnardi | H04M 11/062 370/490 |
| 2007/0153679 A1 | 7/2007 | Jost et al. | |
| 2007/0237185 A1* | 10/2007 | Pereira | H04N 21/2389 370/503 |
| 2008/0049720 A1 | 2/2008 | Liu et al. | |
| 2009/0274149 A1* | 11/2009 | Williams | H04L 47/564 370/389 |
| 2010/0050058 A1 | 2/2010 | Long et al. | |
| 2015/0026542 A1* | 1/2015 | Brennum | H04L 65/605 714/776 |
| 2015/0077516 A1* | 3/2015 | Coto-Lopez | H04N 5/2258 348/43 |

FOREIGN PATENT DOCUMENTS

| | | |
|---|---|---|
| WO | 2009026421 | 2/2009 |
| WO | 2009126253 | 10/2009 |
| WO | WO 2013/13156 A1 | 9/2013 |

OTHER PUBLICATIONS

Applicant: Imagine Communications Corp.; European Patent Application No. 16 765 490.4; Extended European Search Report; Date of Completion: Sep. 28, 2018; 8 pgs.

* cited by examiner

VIDEO STREAM TRANSMISSION OVER IP NETWORK

TECHNICAL FIELD

This disclosure relates generally to communication of video signals over internet protocol (IP) networks.

BACKGROUND

Real-time Transport Protocol (RTP) is a network protocol for delivering media, such as streaming audio and video, over internet protocol (IP) networks. Within the context of RTP, various other protocols and formats have been developed for use in conjunction with RTP to carry media content over IP networks. As an example, the Society of Motion Picture and Television Engineers (SMPTE) has promulgated several standards associated with the transmission and broadcast of media, including the SMPTE 2022 set of standards, which relate to the transport of video over IP networks. For example, SMPTE 2022-1 has been implemented as a method of grouping IP video packets into logical rows and columns and then appending forward error correction packets to each row and column to facilitate recreating lost or corrupt video packets. SMPTE 2022-2 specifies how constant bit rate compressed video can be encapsulated into such IP packets. While these standards have been widely adopted since their inception (e.g., in hardware and/or software), there are some processing limitations. In addition, further error resiliency has been achieved by sending two copies of the data over different paths and combining them at the receiver.

SUMMARY

This disclosure relates generally to video stream transmission over an IP network.

One example provides a system that includes a first buffer that stores first media packets therein received from a first media stream. A second buffer stores second media packets therein received from a second media stream. The first media stream and the second media stream include redundant media content. A combiner reads media packets from each of the first and second buffers, and the combiner discards a given duplicate media packet read from one of the first or second buffers that has been identified as being identical to another of the media packets read from the other of the buffers based on analysis of a predetermined identifier in each of the media packets read from the first and second buffers. The combiner provides an output stream of media packets that includes only one of the identical media packets read from the first and second buffers.

Another example provides a method that includes storing in a first buffer first media packets received from a first media stream. The method also includes storing in a second buffer second media packets received from a second media stream. The first media packets and the second media packets are redundant media streams of packets that include redundant media data packets and redundant error correction packets. The method includes selectively combining the first and second media packets from the first and second buffer to provide an output stream of media packets, the output stream of media packets including the redundant media data packets from one of the first buffer or the second buffer and including the redundant error correction packets from both the first buffer and the second buffer.

Yet another example provides a video processing module. The module includes a first input to receive first media packets from a first media stream and a second input to receive second media packets from a second media stream, the first and second media streams being redundant streams. A first buffer stores the first media packets received via the first input. A second buffer stores the second media packets received via the second input. A combiner is coupled to an output of the first buffer and to an output of the second buffer. The combiner includes a state machine to control operation of the combiner with respect to the media packets at the outputs of the first and second buffers. The state machine causes the combiner to read the media packets from the outputs of the first and second buffers in response to determining that the output media packets are duplicate media data packets having the same sequence identifier and including the same media payload data. The combiner further discards one of the duplicate media data packets read from one of the first buffer or the second buffer and sending another of the duplicate media data packets into an output stream of media packets.

DETAILED DESCRIPTION

This disclosure relates to systems and methods for selectively combining media packets from redundant media streams. The approach herein utilizes parallel buffers for storing media packets from each of the respective streams. For example, the packets can be RTP packets that have been extracted from lower level communication layers (e.g., from Ethernet or other link layer transmission protocol). A combiner can be configured to read packets from the buffers in a manner to align media packets that travel to the combiner via different network paths. The combiner can process the packets to discard duplicate media packets and to send a resulting output stream of packets downstream, such as to a SMPTE 2022 receiver for further processing (e.g., error correction and/or de-encapsulation of media). As a result of implementing such preprocessing of the media packets, increased skew and latency between multiple input streams can be accommodated by downstream receiver processing without requiring reconfiguration or additional functionality in the downstream receiver. Additionally, the overall processing requirements for the downstream receiver can be reduced.

Figure 1:
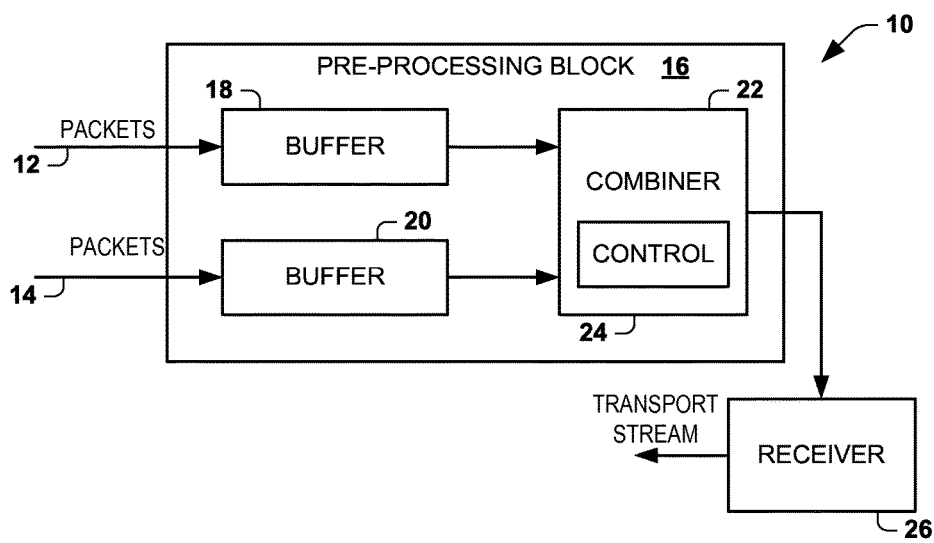
FIG. 1 depicts an example of part of a communication system including a packet pre-processing block.

FIG. 1 depicts an example of part of a communication system 10 that can process media packets received from first and second media streams, demonstrated at 12 and 14. In the example of FIG. 1 and other examples herein, the respective streams 12 and 14 correspond to redundant streams of identical media content. For instance, the redundant streams 12 and 14 can be a video program, advertisement or a combination of multiple programs containing the same encapsulated media content associated with a given media asset. For example, the media packets can be implemented as RTP packets that have been extracted from network layer media streams. In various examples herein, the RTP packets can be transmitted from a transmitter (not shown) according to one or more of the SMPTE 2022 set of standards. Thus, the packets received in the streams 12 and 14 can include media data packets as well as error correction packets adapted according to the SMPTE 2022 standard. As used herein, media data packets refers to the media content for one or more media assets (e.g., video programs) that has been packetized into an ordered sequence of packets, encapsulated and transmitted according to one or more transmission protocols. For instance, each stream may include video program encoded to have a fixed bitrate and defined resolution.

The system 10 includes a preprocessing block 16 that is configured to receive the streams of media packets 12 and 14 at inputs thereof. The preprocessing block 16 includes a respective buffer 18 and 20 to store packets from each of the streams. The buffers 18 and 20 can be configured (e.g, in response to a user input) to establish a corresponding buffer fill level that defines an amount memory used for storing received media packets therein. For example, each of the buffers 18 and 20 can be implemented as a first-in-first-out (FIFO) arrangement in which the media packets are stored in each respective buffer 18, 20 according to the order in which the packets are received in the preprocessing block 16. The preprocessing block 16 also includes a combiner 22 that is configured to selectively combine the media packets from each of the respective buffers 18 and 20.

The preprocessing block 16 provides a video processing module that can support processing of media content (e.g., redundant media content) from multiple sources. For example, the preprocessing block 16 can be implemented in a field programmable gate array (FPGA) configured via firmware to implement an arrangement of logic to perform the functions disclosed herein. In other examples, the preprocessing block 16 can be other forms of hardware, firmware and/or software.

For example, the combiner 22 can include a control 24 that is configured to control processing and transmission operations of the combiner. For example, the control 24 can implement a state machine to control functions of the combiner 33 with respect to the media packets in the buffers 18 and 20, including examining and reading packets from each of the buffers 18 and 20. In response to receiving packets corresponding to a given media asset, the control 24 can cause the combiner 22 to examine packets that are stored in each of the buffers 18 and 20. The packet examination can ascertain an identifier (ID) for each of the packets that are stored in the buffers. For instance, the identifier can be a sequence ID for each packet that specifies where each packet belongs in a respective ordered sequence of packets. As disclosed herein, each media stream 12, 14 can include an ordered sequence of media data packets and another ordered sequence of error correction packets. Under normal expected circumstances, the media data packets remain in a given order. However, transport and other errors can cause one or more packets to be dropped or become out of order compared to other packets in a given one of the streams 12 or 14. The error correction packets for a given media stream can be interspersed within media stream among the media data packets, according to the media transmission protocol (e.g., SMTPE 2022-1).

The control 24 is further configured to cause the combiner 22 to read media packets from one or more of the buffers 18 and 20 based on a condition of the buffers as well based on information in the media packets at the outputs of the buffers. For example, if the IDs for media packets at outputs of the buffers are different, the control can cause the packets having an earlier time location (e.g., a lower packet sequence ID) to be read from its buffer while the later packet remains in its respective buffer. The combiner 22 can continue to read from earlier packets from the same buffer until the IDs for packets at the output of each buffer are determined to be the same. In this way, the combiner 22 can facilitate aligning the streams of media packets in the buffers 18 and 20. Once the packets in the buffers have been aligned (e.g., based upon the identifier in the respective packets indicating the same sequence ID), the combiner 22 can read the identical packets from each of the buffers 18 and 20. The combiner can then discard (arbitrarily) one of the packets while sending the other packet to an output stream that is provided to a corresponding receiver 26. The combiner 22 can repeat the process of reading packets from the buffers 18 and 20 according to the control 24.

The combiner 22 thus can identify or distinguish between error correction packets and media data packets based upon the port number or other indication specified in the header of the respective packets that are stored in the buffers 18 and 20. If a given packet that is read by the combiner 22 from one or more of the buffers 18 and 20 is identified as an error correction (e.g., forward error correction (FEC)) packet, the combiner can send both error correction packets to the receiver 26 for appropriate processing. The combiner 22 can similarly send out-of-order packets read from one or more of the buffers 18 and 20 to the receiver for appropriate processing. For example, the receiver 26 can be programmed according to the SMPTE 2022 standards and thus can implement appropriate error correction according to error correction packets should a packet be identified as missing from the sequence of packets that are received.

Additionally, the alignment of the media packets according to respective sequence numbers by the combiner 22 also operates to align error correction packets in time within the respective buffers 18 and 20. Thus, even though duplicates of FEC packets can be provided directly to the receiver 26, duplicate FEC packets will be less frequent than duplicate media packets. Accordingly, duplicate packet handling mechanisms implemented by the receiver 26 can determine the existence of duplicate FEC packets and process such FEC packets efficiently.

Figure 2:
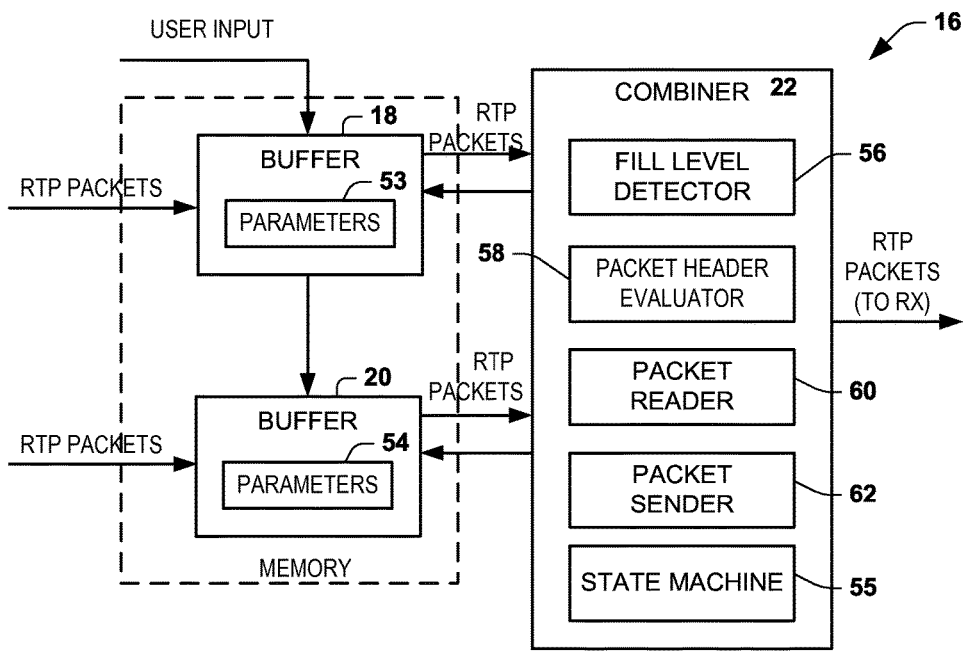
FIG. 2 depicts an example of a packet pre-processing block.

FIG. 2 depicts an example of a preprocessing block 16 such as corresponding to the preprocessing block disclosed with respect to FIG. 1. Identical reference numbers are utilized to refer to features previously introduced with respect to FIG. 1.

In the example of FIG. 2, the preprocessing block 16 thus includes buffers 18 and 20 and a combiner 22. The buffers 18 and 20, for example, temporarily store data from respective streams in respective memory 50. The memory 50 can include one or more physical storage media, such as random access memory. Each of the buffers can be configured to store RTP packets in an allocated area of the memory 50, such as for a default memory space or a memory space allocated in response to a user input. For example, the user input can specify buffer parameters 53 and 54, such as including a pre-set fill level to establish a minimum amount of data packets that are to be stored in each respective buffer 18 and 20 in response to RTP packets received from upstream processing components. For example, the fill level for each of the respective buffers 18 and 20 can be set to accommodate a maximum expected skew between the different input media streams that provide the RTP input packets. The amount of skew between streams can vary according to system configuration and media paths via which the content travels to reach the system 10. While a single memory 50 is shown to include buffers 18 and 20, it is understood that the buffers could be implemented in separate memory devices, which may be separately configured in response to respective user inputs.

As another example, the user input can be utilized by a memory controller to specify a range of addresses in the memory 50 and data structure configuration for storing packets in the respective buffers. Thus, the media packets can be written to the memory 50 in the space that has been configured for each of the respective buffers 18 and 20. For example, the RTP packets from upstream processing can be stored in memory addresses that correspond to an FIFO data structure.

Each of the packets can include a header and payload. The header can include various fields, including a port identifier and a packet sequence number. The port identifier can be employed to route different types of packets (e.g., media data packets and error correction packets) for appropriate application layer processing. The sequence number can identify a location in the ordered sequence of packets where each packet resides in the stream. As disclosed herein, since the streams are redundant, absent transmissions errors, each stream should include the identical sequences of packets— both media data and error correction packets. The media data packets and their correction packets can each have their own separate sequences. The payload of a given media packet will depend on the content being transported via such packet. For example, payload data for a media data packet contains compressed or uncompressed media (e.g., video) encapsulated therein according to one or more transmission protocols. Similarly, payload data for an error correction packet contains error correction coding data for correcting the encapsulated media.

The combiner 22 can include a state machine 55 that is configured to implement logic (see, e.g., FIG. 3) used to control a sequence of functions performed by an arrangement of combiner components. In the example of FIG. 2, the combiner components include a fill level detector 56, a packet header evaluator 58, a packet reader 60 and a packet sender 62. The state machine 55 and other combiner components 56, 58, 60 and 62 can be configured as hardware, firmware and/or software to control preprocessing of RTP input packets to provide a corresponding output stream of packets to a corresponding receiver (e.g., receiver 26 of FIG. 1).

By way of example, the fill level detector 56 can be configured to detect a respective fill level of each of the buffers 18 and 20. The fill level detector 56 can monitor the set fill level (e.g., corresponding to a maximum expected skew) for one or both the buffers 18 and 20. The state machine 55 can employ the information from the fill level detector to determine if one or both of buffers has filled to the preset fill level that has been specified in response to the user input. Once the state machine 55 determines that the buffers have filled to at least the preset level, the combiner can initiate further processing of the packets at outputs of the respective buffers (e.g., operating as FIFO's) 18 and 20. This can ensure that buffers account for stream delay variation and skew between the respective streams.

As mentioned, the packet evaluator 58 can evaluate information in the headers of each of the output packets (first packets in each of the buffers) to determine the type of packet and/or identify the sequence number for the packet. The state machine of the combiner 22 can employ the header information determined by the evaluator 58 to control the packet reader 60 to read packets from one or more of the buffers 18 and 20. In response to instructions from the state machine 55, the packet reader 60 thus reads packets based on the header evaluation.

As one example, the packet reader 60 reads packets from one of the buffers if the sequence numbers are not the same for a media data packet. If one or both of the RTP packets at the output of the buffers 18 and 20 is determined to be an error correction packet (e.g., based upon the header evaluation data indicating a port address established for an error correction packet), the state machine 55 can cause the packet reader 60 to read each such output packet from the buffer 18 and/or 20. The state machine 55 can in turn cause the packet sender 62 to forward such packets (e.g., an out of sequence packet or an error correction packet) in the output stream downstream to the receiver (e.g., receiver 26). Alternatively, if the packet header evaluator 58 determines that the sequence numbers of the output media data packets in the buffers are different (e.g., indicative of non-aligned media streams), the state machine 55 causes the packet reader 60 to read the packet with the lower sequence number from its buffer and the packet sender 62 to send such packet downstream. So long as the media data packets have different sequence numbers, the combiner 22 will continue read data packets from one of the packets until the streams become time aligned.

Thus, if the packet header evaluator 58 determines that the sequence numbers of the output packets in the buffers are the same (e.g., indicative of non-aligned streams), the state machine 55 causes the packet reader 60 to read the packets from both streams, discard one of the packets and cause the packet sender 62 to send the remaining packet downstream. The combiner 22 can arbitrarily discard one of the identical packets that is read from the buffers 18 and 20. The state machine 55 then causes the process to be repeated from the beginning for the next packets in the buffers 18 and 20. As a result of this preprocessing, stream delay variation can be accommodated. Additionally, the processing can prevent duplicate media packets from being sent downstream for further processing. For example, a SMPTE 2022 receiver can implement error correction based on the error correction packets provided by the sender 62 without having to deal with duplicate media packets.

Figure 3:
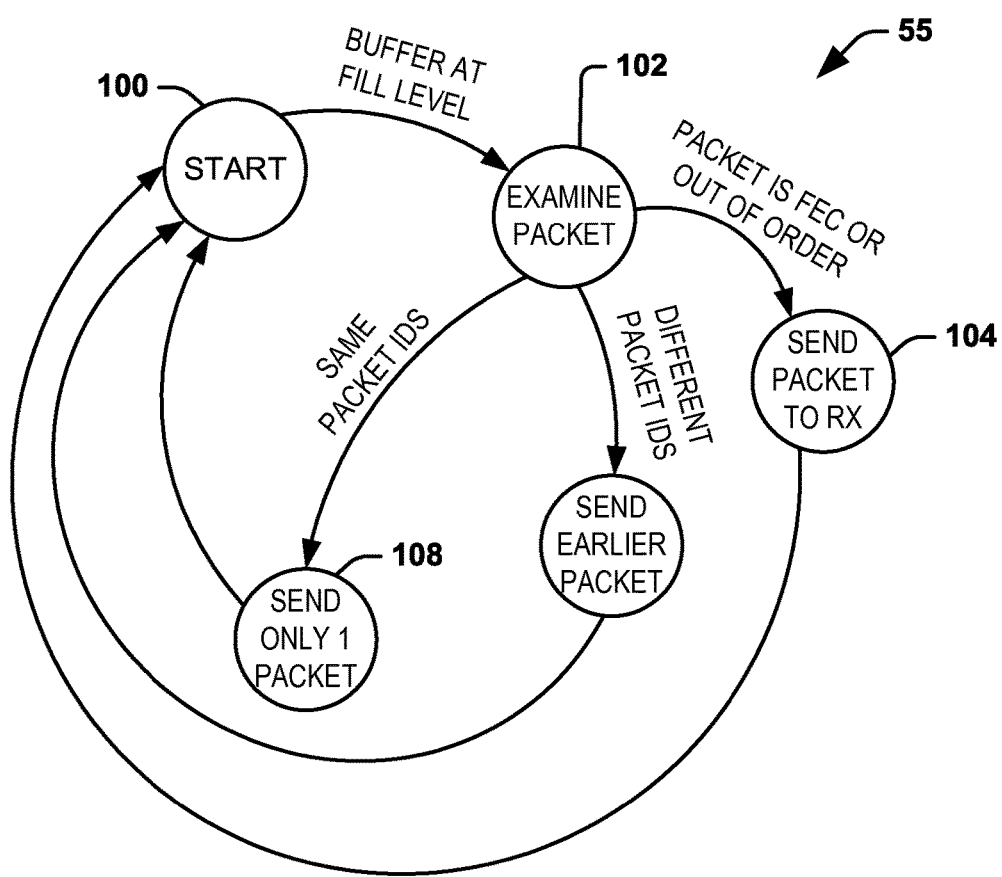
FIG. 3 depicts an example of diagram for a state machine that can be utilized to control packet pre-processing.

In view of the structural and functional features described above, certain methods will be better appreciated with reference to FIG. 3. It is to be understood and appreciated that the illustrated actions, in other embodiments, may occur in different orders or concurrently with other actions. Moreover, not all features illustrated in FIG. 3 may be required to implement a state machine. As mentioned, it is to be further understood that the state machine 55 can be implemented in hardware (e.g., one or more integrated circuits, such as in an ASIC), firmware (e.g., an FPGA), software (e.g., stored in a computer readable medium or as executable instructions running on one or more microprocessors), or as a combination of hardware, firmware and software.

FIG. 3 depicts an example of a state machine 55 that can be utilized to control preprocessing (e.g., preprocessing block 16 of FIGS. 1 and 2). The state machine begins at 100 and detects a buffer fill level of each input buffer (e.g., buffers 18 and 20). If the buffers have are determined at 100 to be at a predetermined fill level the state machine transitions to state 102 to examine the first packets at the output of the buffers. From 102, the state machine can transition to one of several states depending on the examination of the buffered packets at 102. For instance, if one or more packets are determined to be an error correction packet (e.g., FEC packet (e.g., based on its port address specifying an error correction port), the state machine can transition to state 104. Alternatively, if such packet(s) is determined to be an out-of-order packet based on its sequence ID compared to the sequence ID from one or more previous packets, the state machine likewise can transition from 102 to 104. At 104, the state machine sends the packet (e.g., FEC packet or out-of-order packet) from the buffer to the receiver for further processing.

Alternatively, if based on the packet examination for the output packets in the buffers determines that the packets have different packet sequence IDs, indicating a non-alignment of packets within the buffers, the state machine transitions to 106. At 106, the machine reads and sends the earlier packet (e.g., packet having the lower sequence ID) from its buffer to the receiver for further processing. The later packet (e.g., packet having the higher sequence ID) remains in the other buffer. Depending on the latency between buffers, this operation may repeat for a number of packets until the examination at 102 determines that the packet IDs are the same, which corresponds to an alignment between the streams. Thus, the pre-processing can operate to align non-aligned streams. By aligning the streams according the sequence IDs for the media data packets, the FEC packets are also aligned in time within the respective buffers such that the downstream receiver can readily process duplicate FEC packets, which are interspersed among the media data packets.

As yet a further alternative, if packet header examination at 102 for the output packets in the buffers determines that the packets have the same packet sequence IDs, indicating alignment between streams within the buffers, the state machine transitions to 108. Since the streams are redundant streams for given media content, media data packets having the same packet sequence ID are known to be identical. Thus, at 108, the state machine reads and sends one of the identical packets (e.g., having the same sequence IDs) from a given one of the buffers to the receiver for further processing. At 108, the other identical packet from the other buffer is discarded. Thus, only one of the duplicate packets is sent to the receiver in a single merged stream of media packets for further processing. From 108 as well as 104 and 106, the state machine returns to the beginning for processing the next packets in the buffers.

The preprocessing implemented by the state machine 55 can enable an existing SMPTE 2022-1 or -2 (or part 5 or 6) receiver to implement hitless switching under conditions similar to as defined by SMPTE 2022-7. That is the preprocessing implemented by the state machine 52 can accommodate stream delay variations and significantly reduce the number of duplicate packets sent to the existing SMPTE 2022 receiver.

Figure 4:
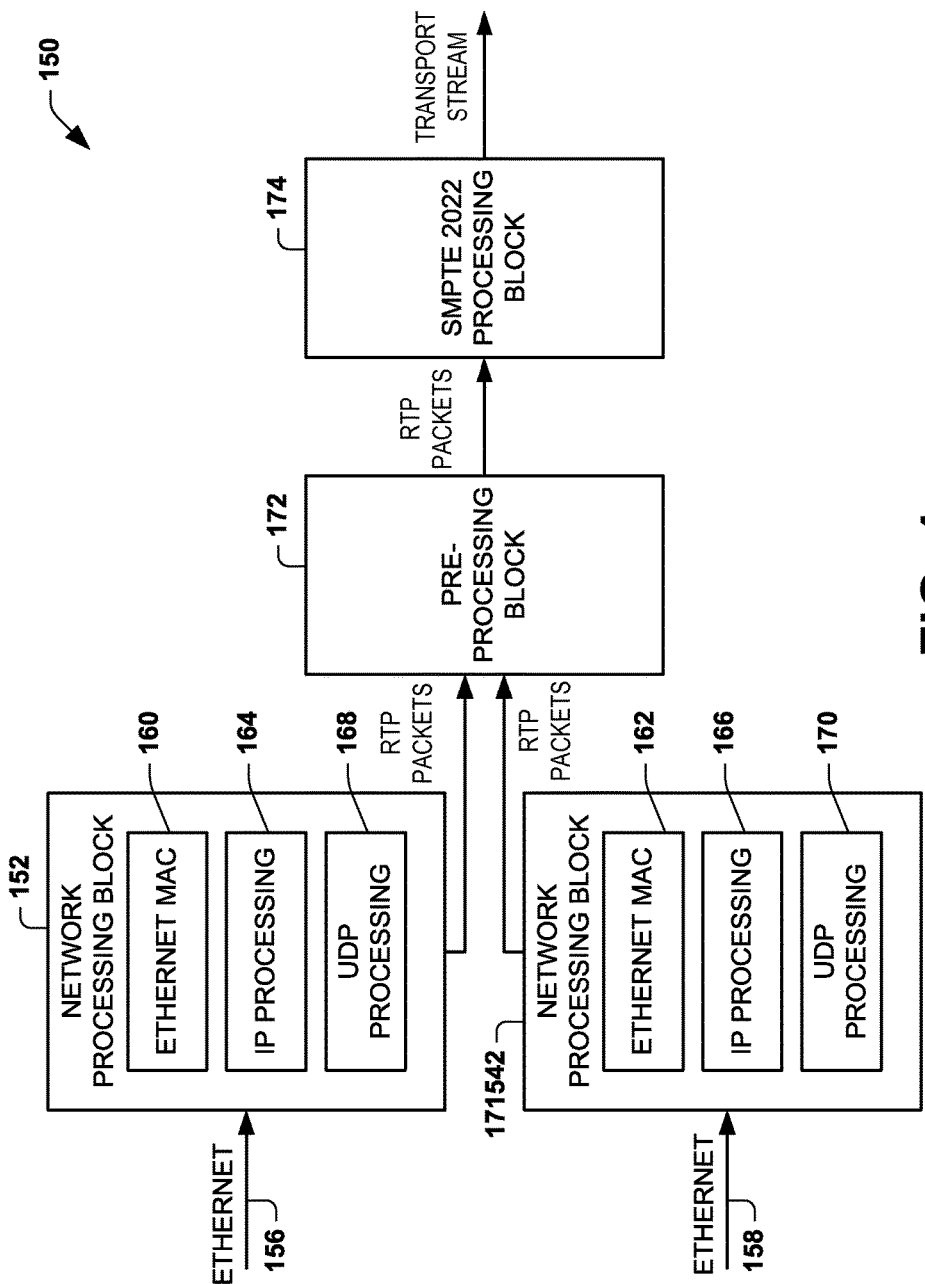
FIG. 4 depicts an example of another part of a communication system that can implement a packet pre-processing block.

FIG. 4 depicts an example of a portion of a receiver system 150 that can be implemented in a redundant stream environment. The receiver system 150 includes network processing blocks 152 and 154 configured to extract RTP packets from input Ethernet streams 156 and 158. For example, each of the network processing blocks 152 and 154 can include an Ethernet MAC processing block 160, 162. The Ethernet MAC processing blocks 160 and 162 can perform link layer processing and media access control for addressing and channel access control mechanisms for communication of media stream via Ethernet medium. An IP processing block 164 and 166 implements a communications protocol layer for transporting and routing IP based packets to the receiver system 150. The IP processing block thus captures packets and passes the packets to the transport layer processing blocks 168 and 170. The transport layer processing blocks 168 and 170 implements transport layer services to maintain transport of streaming media from the media source(s) to the receiver system 150. For example, the transport layer processing blocks 168 and 170 implement the user datagram protocol (UDP); although other transport layer protocols could be utilized (e.g., transmission control protocol (TCP)).

The transport layer processing blocks 168 and 170 thus can provide respective streams of RTP packets to a preprocessing block 172. The preprocessing block 172 can be implemented according to the examples of disclosed herein with respect to FIGS. 1-3. Thus, preprocessing block 172 can process multiple redundant streams of RTP packets from network processing blocks 152 and 154 and provide a corresponding stream of output RTP packets to a SMPTE 2022 processing block 174. For example, the stream of output RTP packets can include merged stream of media data packets (e.g., having discarded duplicate RTP packets) yet still include duplicate FEC packets. The SMPTE 2022 processing block 174 can be implemented to process the media data packets and FEC packets to output a corresponding transport stream to one or more destination.

As an example, the SMPTE 2022 processing block 174 can be implemented in firmware of an FPGA device; although, in other examples, it could be hardware, firmware in other devices, or software execute by a processor or any combination thereof. Because of the pre-processing block 172 that operates to align streams and to remove duplicate packets from the redundant streams, as disclosed herein, the SMPTE 2022 processing block 174 can operate efficiently in redundant stream environments with large skew or latency between respective streams.

As will be appreciated by those skilled in the art, portions of the systems and methods disclosed herein may be embodied as a method, data processing system, or computer program product (e.g., a non-transitory computer readable medium having instructions executable by a processor). Accordingly, these portions of the present invention may take the form of an entirely hardware embodiment, an entirely software embodiment, or an embodiment combining software, firmware and hardware. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments are disclosed herein with reference to state diagram illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable apparatus (or a combination of devices and circuits) to produce a machine, such that the instructions, which execute via the processor or other circuitry, implement the functions specified in the block or blocks.

These computer-executable instructions may also be stored in a non-transitory computer-readable medium that can direct a computer or other programmable apparatus (e.g., one or more processing core or logic blocks in an FPGA) to function in a particular manner, such that the instructions stored in the computer-readable medium result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks or the associated description.

What are disclosed herein are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims.

As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
    a first buffer that stores first media packets therein received from a first media stream comprising error correction packets;
    a second buffer that stores second media packets therein received from a second media stream comprising error correction packets, the first media stream and the second media stream including redundant content that is transmitted separately; and
    a combiner that reads media packets from each of the first and second buffers, the combiner discarding a given duplicate media packet read from one of the first or second buffers that has been identified as being identical to another of the media packets read from the other of the buffers based on analysis of a predetermined identifier in each of the media packets read from the first and second buffers, such that the combiner provides an output stream of packets that includes only one of the identical media packets read from the first and second buffers and the error correction packets from both of the first and second media stream.

2. The system of claim 1, wherein the predetermined identifier specifies a sequence number for each media packet.

3. The system of claim 1, wherein each of the first buffer and the second buffer is configured to store media packets therein according to a buffer fill level, wherein the buffer fill level is set to a value to accommodate at least a maximum expected skew between transmission of media packets in the first media stream and the second media stream.

4. The system of claim 3, wherein the combiner further comprises:
    a packet evaluator to evaluate a header of corresponding media packets from the first and second buffers;
    a packet reader to read the given packet from one of the first and second buffers based on the packet evaluator determining the given packet has a different identifier from a corresponding packet in the other of the first and second buffers, indicating the given packet is an earlier packet; and
    a packet sender to send the given packet in the output stream of packets while the corresponding packet remains in the other of the first and second buffers.

5. The system of claim 1, wherein each of the first and second buffers is configured as a first-in-first-out buffer to store packets therein according to an order that the packets are received by each of the respective first and second buffers.

6. The system of claim 1, wherein the combiner further comprises:
    a packet evaluator to evaluate a header of the given packet; and
    a packet sender to send the given packet in the output stream of packets based on the packet evaluator determining the given packet is an error correction packet or is an out of order packet in a respective stream from which the given packet arrived.

7. The system of claim 1, wherein the combiner further comprises:
    a packet evaluator to ascertain a value for the predetermined identifier in a given packet from the first buffer and a given packet from the second buffer;
    a packet reader to read from one of the first buffer or second buffer whichever of the respective given packets has a lower value for its predetermined identifier; and
    a packet sender to send into the output stream of packets the respective given packet read from the one of the first buffer or second buffer.

8. The system of claim 7, wherein the packet sender is adapted to send the one of the identical media data packets read from the first buffer or the second buffer in the output stream of packets in response to the packet evaluator ascertaining that the predetermined identifier in the given packet of the first buffer and the given packet of the second buffer have identical values and both are media data packets containing the same media payload.

9. The system of claim 1, further comprises a receiver configured to process the output stream of packets from the combiner according to the 2022 standards of the Society of Motion Picture and Television Engineers and provide a corresponding transport stream.

10. The system of claim 9, wherein the combiner further comprises a state machine to control operation of the combiner, wherein if output media packets in each of the first and second buffers are not identical media data packets, the state machine causing the combiner to:
    read and send a given output media packet from at least one of the first and second buffers to the output stream of packets if the given output media packet is determined to be an error correction packet or an out of order packet for its respective stream; and
    read and send the given output media packet to the output stream of packets if the given output media packet is determined to be an earlier media data packet in a sequence of media data packets for one of the first and second media streams compared to a corresponding output media packet in the sequence of media data packets for the other of the first and second streams.

11. A method comprising:
    storing in a first buffer first media packets received from a first media stream;
    storing in a second buffer second media packets received from a second media stream, the first media packets and the second media packets being redundant media streams of packets that include redundant media data packets and redundant error correction packets; and selectively combining the first and second media packets from the first buffer and the second buffer to provide an output stream of media packets, the output stream of media packets including the redundant media data packets from one of the first buffer or the second buffer and including the redundant error correction packets from both the first buffer and the second buffer.

12. The method of claim 11, wherein selectively combining further comprises:
evaluating headers of output media packets in each of the first buffer and the second buffer;
determining that the output media packet from the first buffer is an output media data packet having the same sequence identifier as an output media data packet in the second buffer based on the evaluation; and
discarding one of the redundant media data packets read from one of the first buffer or the second buffer based on the determination; and
sending another of the redundant media data packets read from another of the first buffer or the second buffer into the output stream of media packets.

13. The method of claim 11, wherein selectively combining further comprises:
evaluating headers of output media packets in each of the first buffer and the second buffer; and
sending a given output media packet to the output stream of media packets in response to determining that the given output media packet is an error correction packet or is an out-of-order packet in the stream from which the given packet arrived based on the evaluation.

14. The method of claim 11, wherein selectively combining further comprises:
evaluating headers of output media packets in each of the first buffer and the second buffer;
reading the output media data packet from the first buffer while the output media data packet remains in the second buffer in response to determining that the output media packet from the first buffer is an output media data packet having a lower sequence identifier compared to a sequence identifier of the output media data packet in the second buffer based on the evaluation; and
sending the output media data packet read from the first buffer into the output stream.

15. The method of claim 11, wherein the media packets are stored in each of the first buffer and the second buffer in a sequence according to an order that the packets are received by each of the respective first and second buffers.

16. The method of claim 11, wherein each of the media packets comprise Real-time Transport Protocol (RTP) packets implemented according to the 2022 standards of the Society of Motion Picture and Television Engineers (SMPTE), the method further comprising processing the output stream of media packets according to at least one of SMPTE 2022-1 and SMPTE 2022-2 or at least one of SMPTE 2022-5 and SMPTE 2022-6 to provide a corresponding transport stream.

17. A video processing module, comprising:
a first input to receive first media packets from a first media stream;
a second input to receive second media packets from a second media stream, the first and second media streams being redundant streams;
a first buffer that stores the first media packets received via the first input;
a second buffer that stores the second media packets received via the second input; and
a combiner coupled to an output of the first buffer and to an output of the second buffer, the combiner comprising a state machine to control operation of the combiner with respect to an evaluation of the media packets at the outputs of the first and second buffers, the state machine causing the combiner to read the media packets from the outputs of the first and second buffers in response to determining that the media packets at the outputs of the first and second buffers are duplicate media data packets having the same sequence identifier, the combiner discarding one of the duplicate media data packets read from one of the first buffer or the second buffer and sending another of the duplicate media data packets into an output stream of media packets;
wherein in response to determining that at least one of the media packets at the outputs of the first and second buffers is an error correction packet or an out-of-order packet for its respective stream, the state machine causing the combiner to read and send the at least one media packet from the respective buffer to the output stream.

18. The video processing module of claim 17, wherein in response to determining that a given media packet at the output of one of the first and second buffers is a media data packet having a lower sequence identifier compared to a corresponding media data packet at the output of the other of the first and second buffers, the state machine causing the combiner to read and send the given media packet to the output stream while the corresponding media data packet remains in the other of the first and second buffers.

19. The system of claim 1, wherein a subset of media packets of one of the first media packets and the second media packets is determined to be out-of-order relative to previous media packets in a respective stream, wherein the output stream of packets provided by the combiner further include the subset of media packets from one of the first and the second media streams determined to be out-of-order.

20. The system of claim 16, wherein the combiner is to compare a sequence identifier (ID) of each media packet from each of the first and second media streams relative to a sequence ID of previous media packets from each of the first and second media streams to identify each media packet in each of the media streams that is out-of-order corresponding to the subset of media packets.

21. The method of claim 11, wherein a subset of media packets of the first media packets and the second media packets is determined to be out-of-order relative to previous media packets in each respective stream, wherein the output stream of packets further include the subset of media packets from one of the first and the second media streams determined to be out-of-order.

* * * * *